United States Patent
Suto (10) Patent No.: US 8,194,293 B2
(45) Date of Patent: *Jun. 5, 2012

(54) SCANNER APPARATUS AND INFORMATION DISPLAY SYSTEM PROVIDED WITH THE SAME

(75) Inventor: Yasuhiro Suto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 934 days.

This patent is subject to a terminal disclaimer.

(21) Appl. No.: 12/173,838

(22) Filed: Jul. 16, 2008

(65) Prior Publication Data

US 2009/0021805 A1 Jan. 22, 2009

(30) Foreign Application Priority Data

Jul. 20, 2007 (JP) ................................. 2007-189282

(51) Int. Cl.
*H04N 1/04* (2006.01)

(52) U.S. Cl. ............ 358/474; 358/497; 358/498; 399/85

(58) Field of Classification Search .................. 358/498, 358/496, 1.15, 474, 501, 505; 399/85, 84, 399/382

See application file for complete search history.

(56) References Cited

U.S. PATENT DOCUMENTS

| | | | | |
|---|---|---|---|---|
| 4,792,827 A | * | 12/1988 | Ogura | 399/81 |
| 5,198,909 A | * | 3/1993 | Ogiwara et al. | 358/412 |
| 5,710,634 A | * | 1/1998 | Kuriyama et al. | 358/296 |
| 6,057,944 A | * | 5/2000 | Takeuchi | 358/468 |
| 6,970,262 B1 | * | 11/2005 | Saito | 358/1.15 |
| 7,715,066 B2 | * | 5/2010 | Michiie | 358/474 |
| 7,924,475 B2 | * | 4/2011 | Suzuki | 358/474 |
| 8,014,043 B2 | * | 9/2011 | Suto | 358/474 |
| 2007/0166088 A1 | * | 7/2007 | Yokobori et al. | 399/382 |
| 2008/0025637 A1 | * | 1/2008 | Kashiwagi et al. | 382/282 |
| 2008/0049247 A1 | * | 2/2008 | Asai et al. | 358/1.15 |
| 2009/0237718 A1 | * | 9/2009 | Hiro | 358/1.15 |
| 2010/0142013 A1 | * | 6/2010 | Park et al. | 358/498 |

FOREIGN PATENT DOCUMENTS

| | | |
|---|---|---|
| JP | 05-338926 | 12/1993 |
| JP | 06-009064 | 1/1994 |
| JP | 10-333594 | 12/1998 |
| JP | 2000-029252 | 1/2000 |
| JP | 2004-131268 | 4/2004 |
| JP | 2006-027804 | 2/2006 |

* cited by examiner

*Primary Examiner* — Negussie Worku (74) *Attorney, Agent, or Firm* — Renner, Otto, Boisselle & Sklar, LLP (57) ABSTRACT

A compact scanner apparatus is provided that is suitable for constituting an information display system by being stored in a pedestal which supports a display apparatus. The scanner apparatus is composed of an upper unit provided with an automatic document feeder and a lower unit provided with an image reading device, wherein a width guide rack mechanism having a function of detecting an original size is independent from a paper feed tray and disposed above the paper feed tray. Thereby, it is possible to store the paper feed tray and the whole of the width guide rack mechanism within the apparatus.

7 Claims, 10 Drawing Sheets

SCANNER APPARATUS AND INFORMATION DISPLAY SYSTEM PROVIDED WITH THE SAME

CROSS-NOTING PARAGRAPH

This Non-provisional application claims priority under 35 U.S.C. §119(a) on Patent Application No. 2007-189282 filed in JAPAN on Jul. 20, 2007,the entire contents of which are hereby incorporated herein by reference.

FIELD OF THE INVENTION

The present invention relates to a scanner apparatus which is suitable for being disposed below a large-sized display apparatus supported by a stand, and an information display system provided with the scanner apparatus.

BACKGROUND OF THE INVENTION

In recent years, as electronic conference systems, an electronic conference system is proposed, that conference contents are directly written on a large-sized liquid crystal screen in a free format using input means such as a touch pen and all of the conference contents are converted into electronic information, so that the document management, distribution to the participants, and processing of the contents, after the conference, are easily performed.

Further, a system form is also proposed, that a scanner apparatus is connected to a display apparatus through a network to convert the information included in an additional sheet into electronic information and capture the electronic information in the display apparatus during a conference.

However, since the scanner apparatus is not always necessary in a presentation, when holding a conference using the display apparatus, the scanner apparatus connected to the display apparatus can be obstructive by contraries. Then, the scanner apparatus is disposed in the lower side of a pedestal which supports the display apparatus, and thereby an electronic conference system as described above can be configured easily. This requires making the structure compact, for example, by storing a paper feed tray which protrudes to outside of a housing of the scanner apparatus in the housing of the apparatus.

However, in a paper feed apparatus having a function of detecting a paper size, a width guide rack mechanism is generally provided in the lower side of a paper feed tray (for example, Japanese Laid-Open Patent Publication No. 6-9064).

Accordingly, even when trying to employ the structure in which a paper feed tray is stored further inside in order to make the scanner apparatus more compact, it is impossible to store the paper feed tray further inside when a size detection mechanism for detecting a width size of an original is provided in the lower side of the paper feed tray as the above conventional technique.

Further, there is a problem that when the paper feed tray is stored within the housing of the apparatus main body, a width guide member can not be operated from outside.

SUMMARY OF THE INVENTION

An object of the present invention is to provide a compact scanner apparatus that stores a width guide rack mechanism provided with a paper feed tray and a function of detecting an original size in it, wherein the width guide rack mechanism can be operated from outside of a housing and can be disposed in a lower side of a pedestal of a display apparatus, and an information display system provided with the scanner apparatus.

Another object of the present invention is to provide a scanner apparatus comprising: an upper unit provided with an automatic document feeder including a paper feed tray in which a sheet original is stored so as to be stackable and a width guide rack mechanism having an original size detection function of detecting a size of the sheet original stacked on the paper feed tray; and a lower unit provided with an image reading device for reading an image of the sheet original transported from the automatic document feeder, wherein the width guide rack mechanism is provided above the paper feed tray.

Another object of the present invention is to provide a scanner apparatus, wherein the width guide rack mechanism includes a width guide member, and the width guide member can be operated from outside of the apparatus.

Another object of the present invention is to provide a scanner apparatus, wherein the paper feed tray includes an auxiliary tray for supporting a part of the stacked original, and the auxiliary tray is stored in an inner part of the paper feed tray so as to be drawable.

Another object of the present invention is to provide a scanner apparatus further comprising a rotatable front door in a position facing to the paper feed tray, wherein the front door functions as an auxiliary discharge tray in an opened state.

Another object of the present invention is to provide a scanner apparatus further comprising slide members which are supported slidably on both outsides of a housing of the apparatus symmetrically.

Further, another object of the present invention is to provide an information display system, wherein the scanner apparatus with the slide members supported slidably is stored between a pair of legs facing each other of a pedestal which supports a display apparatus on top of the legs and the scanner apparatus is connected to the display apparatus so that image information of the original read by the scanner apparatus can be displayed on a display portion of the display apparatus.

Another object of the present invention is to provide an information display system, wherein the display apparatus includes a touch panel on a front face of the display portion.

PREFERRED EMBODIMENTS OF THE INVENTION

Now, referring to the accompanying drawings, embodiments of the present invention will hereinafter be described.

Figure 1:
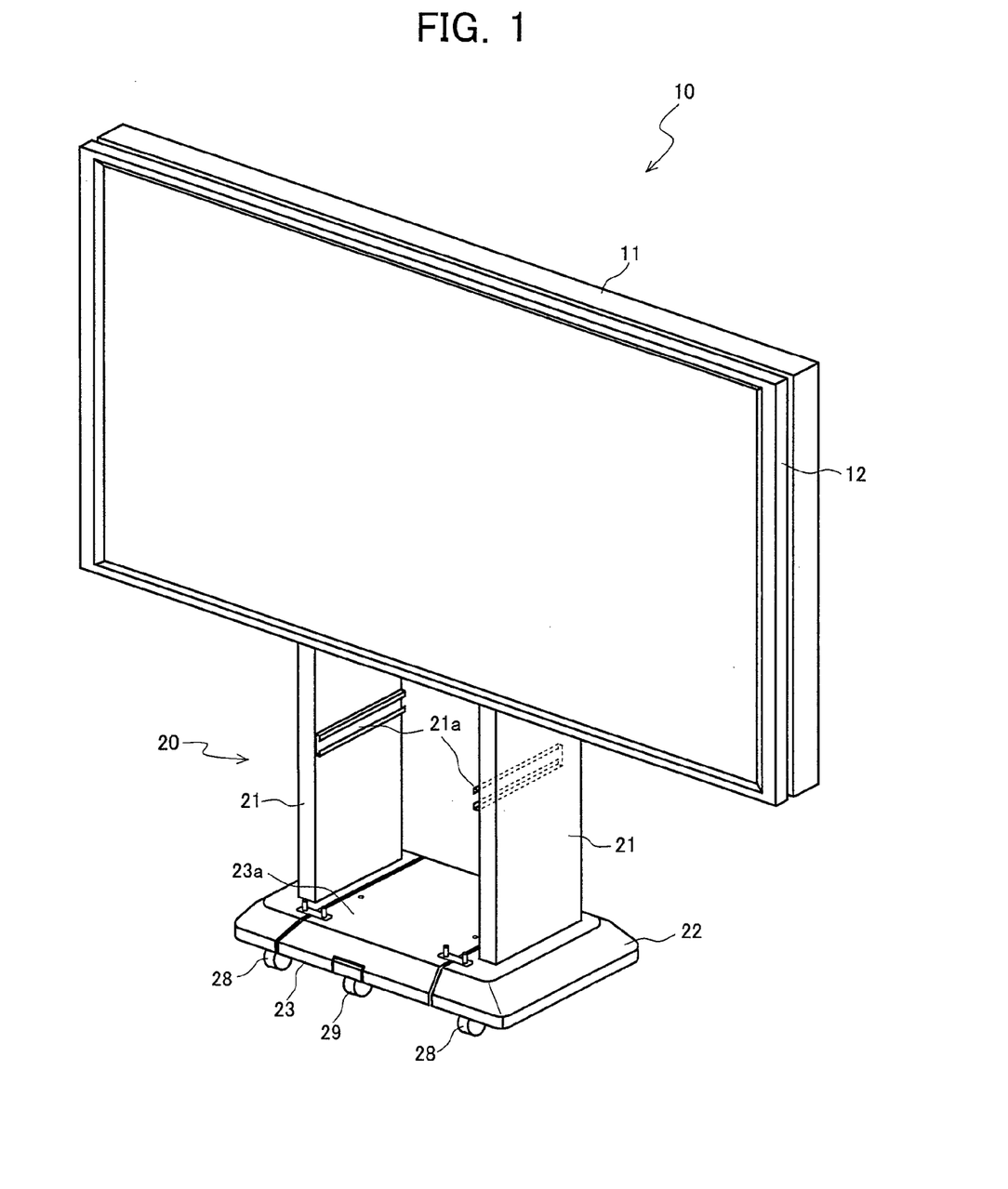
FIG. 1 is a diagram showing an overview of a display apparatus and a pedestal used in an information display system of the present invention.

FIG. 1 is a diagram showing an overview of an information display system suitable for an electronic conference etc., which is configured by storing and arranging electronic equipment such as a scanner apparatus and a printer according to the present invention in the lower side of a pedestal which supports a large-sized display apparatus.

A pedestal 20 which supports a display apparatus 10 includes a pair of legs 21, a base 22, and a falling preventive leg 23, and casters for moving (wheels for moving) 28 are provided on the bottom of the base 22. Rail portions 21a are provided in the insides of right and left legs 21 of the pedestal 20 to store a scanner apparatus 50, which will be described below, so as to be pulled out freely.

Figure 2A:
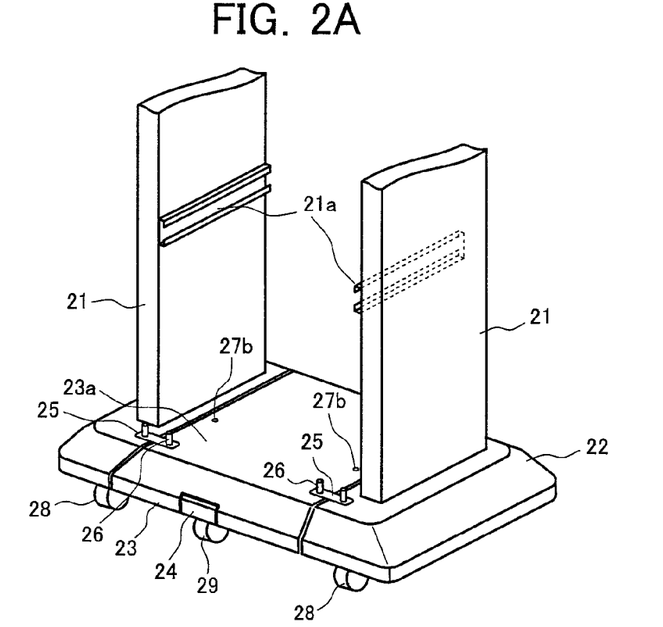
FIGS. 2A and 2B are diagrams illustrating a falling preventive leg shown in FIG. 1.
Figure 2B:
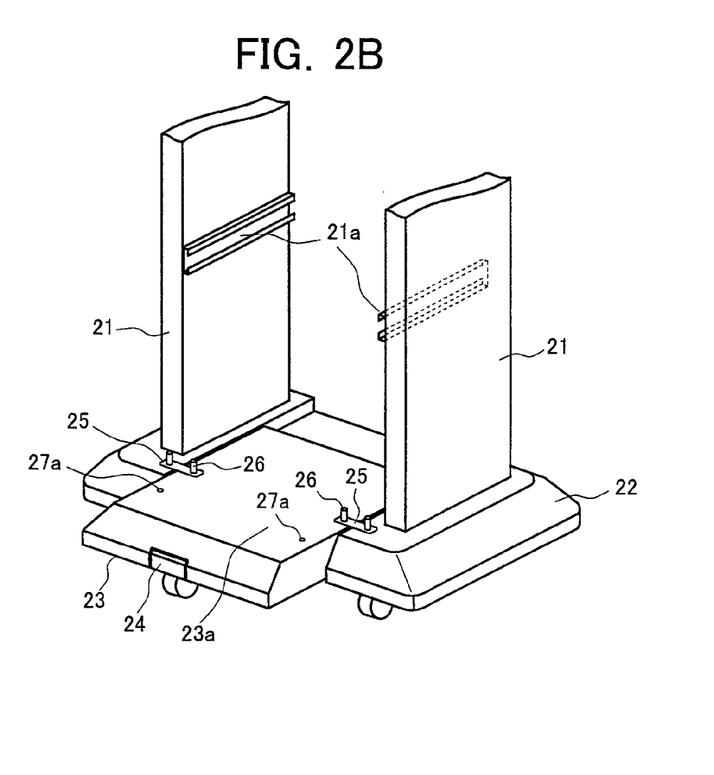

FIGS. 2A and 2B are illustrative views of the falling preventive leg 23. The falling preventive leg 23 is provided so as to be slidable with respect to the base 22, and a caster for preventing fall 29 is provided on the bottom thereof. In order to put the pedestal 20 in the falling preventive state, fixing pins 26 are pulled out in the state shown in FIG. 2A, followed by grasping and pulling a releasing lever 24 to pull out the falling preventive leg 23, then fixing holes 27b provided on a mounting portion 23a are adjusted to positions of fixing fittings 25 to insert the fixing pins 26, so as to make the pedestal 20 in the state shown in FIG. 2B. The caster for preventing fall 29 is provided so as to be separated from a floor face in a state where the falling preventive leg 23 is stored, and to be in contact with the floor face in a state where the falling preventive leg 23 is pulled out, and thereby the falling preventive leg can be easily pulled out.

By storing electronic equipment in the pedestal 20 as described above, for example, as shown in FIG. 3, the printer 30 and the scanner apparatus 50, which are not used at all times, can be stored in the pedestal 20, and a user who gives a presentation as is operating the display apparatus 10 is not disturbed. Note that, in the display apparatus shown in FIG. 3, in consideration of the operability for a user who is leading a conference, an operation input portion 13 used for setting a display of an initial screen etc., a touch pen holder 14 in which a touch pen is stored, and a power switch 15 are provided in the right end.

Figure 4:
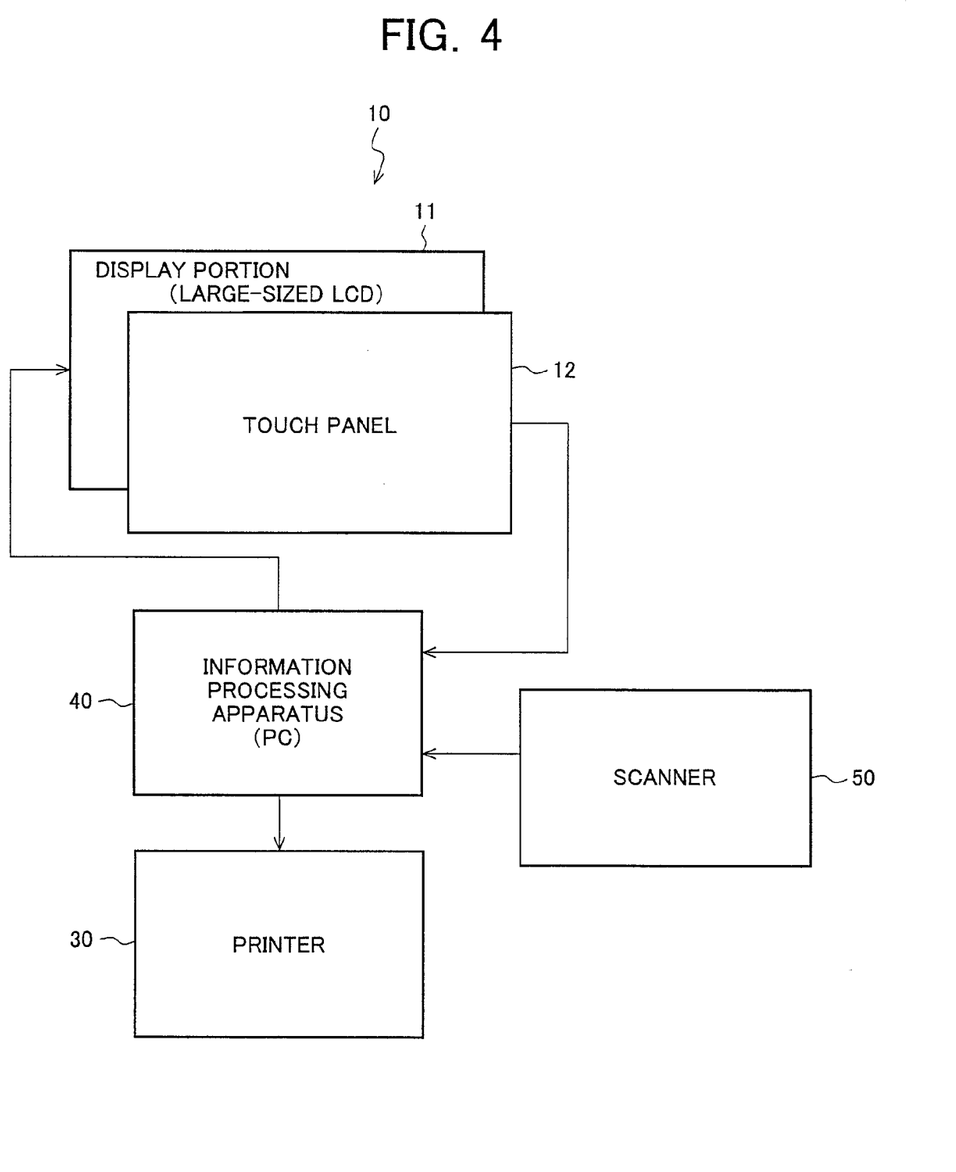
FIG. 4 is a structural block diagram of the information display system of FIG. 3.

FIG. 4 is an overall block diagram of the information display system according to the present invention, in which the display apparatus 10 is composed of a display portion 11 and a touch panel portion 12 provided on a front face of the display portion 11, and is able to detect a coordinate of the touched part on the touch panel portion 12 and display various information based on a touch operation. The display apparatus 10 is connected to an information processing apparatus (PC) 40, and outputs information to be displayed by the display portion 11. The printer 30 is an apparatus for printing out display information displayed by the display portion 11, and corresponds to an electronic equipment in the information display system of the present invention. The scanner apparatus 50 converts the information read from a sheet original into electronic information, in which the read data may be displayed on the display portion 11 through the information processing apparatus (PC) 40, or when the display apparatus 10 has a function of the image processing, the data may be directly transmitted from the scanner apparatus 50 to the display apparatus 10.

Figure 5A:
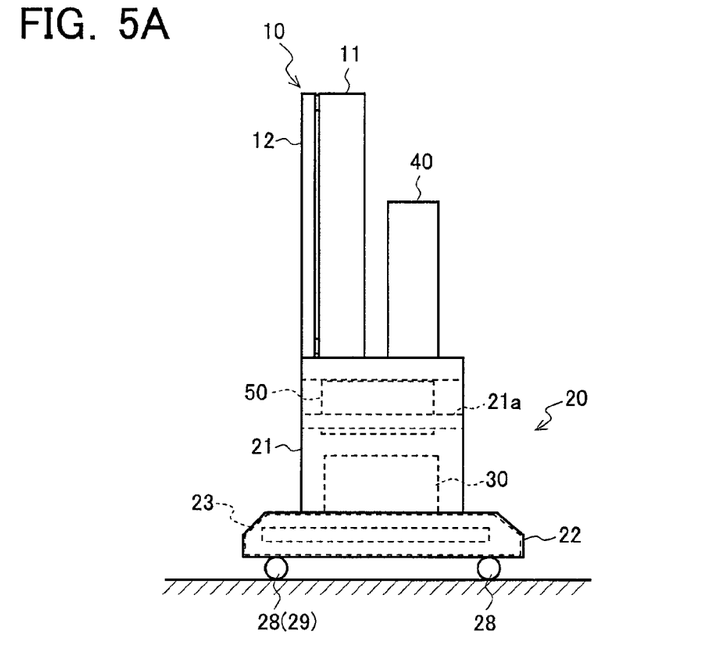
FIGS. 5A and 5B are illustrative views of the information display system according to the embodiment of the present invention.
Figure 5B:
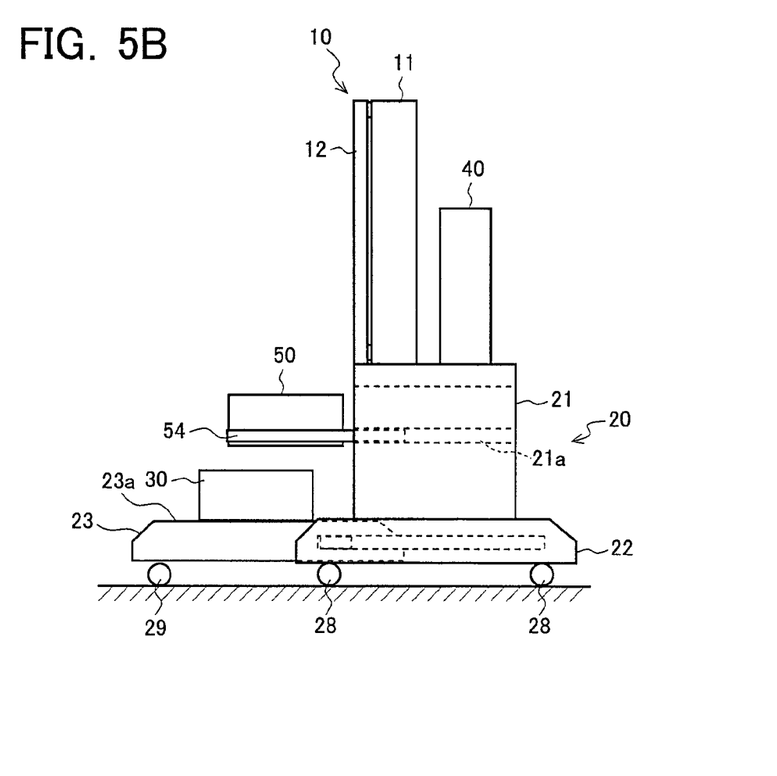

FIGS. 5A and 5B are diagrams illustrating the information display system according to the embodiment of the present invention, and in the present embodiment, the information processing apparatus 40 is disposed in the rear side of the display apparatus 10, and FIG. 5A shows a state where the falling preventive leg 23 on which the printer 30 is placed and the scanner apparatus 50 are stored in the storage space of the pedestal 20. FIG. 5B shows a state where the printer 30 placed on the mounting portion 23a of the falling preventive leg 23 and the scanner apparatus 50 are pulled out, and, as described below, slide members 54 which slide on the rail portions 21a provided in the insides of the pedestal 20 are symmetrically attached to both outsides of a housing of the scanner apparatus 50. With the slide members 54, the scanner apparatus 50 is supported slidably with respect to the pedestal 20.

Figure 6:
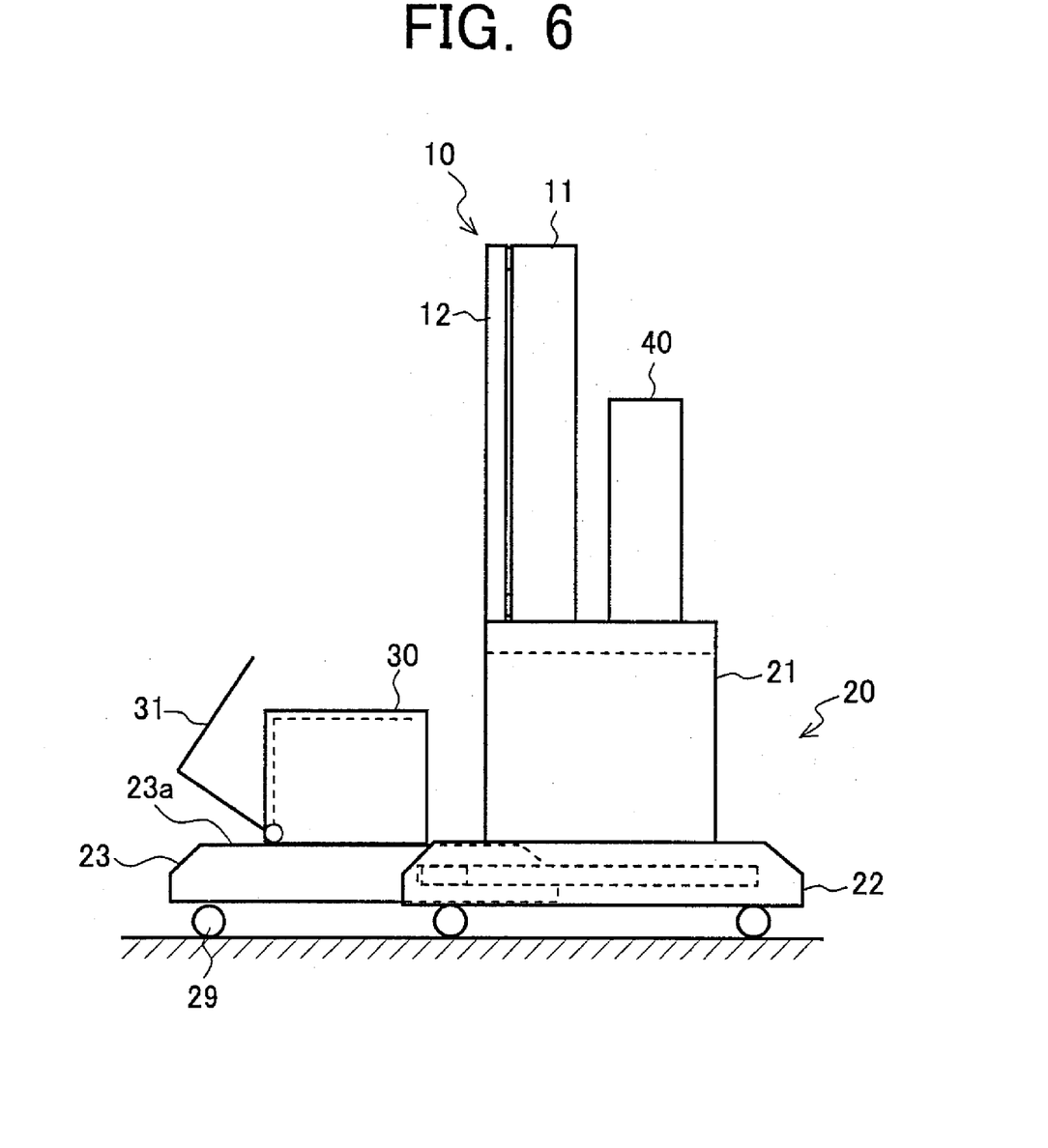
FIG. 6 is a diagram illustrating a state of using electronic equipment (a printer) in the information display system having the pedestal provided with the falling preventive leg shown in FIG. 1.

FIG. 6 is a diagram showing a state using the printer 30 in the above information display system, in which the falling preventive leg 23 is pulled toward the near side and the printer 30 placed on the mounting portion 23a is pulled out, and thereby a cover 31 is opened and the replacing of a developer cartridge etc., can be performed.

Figure 7A:
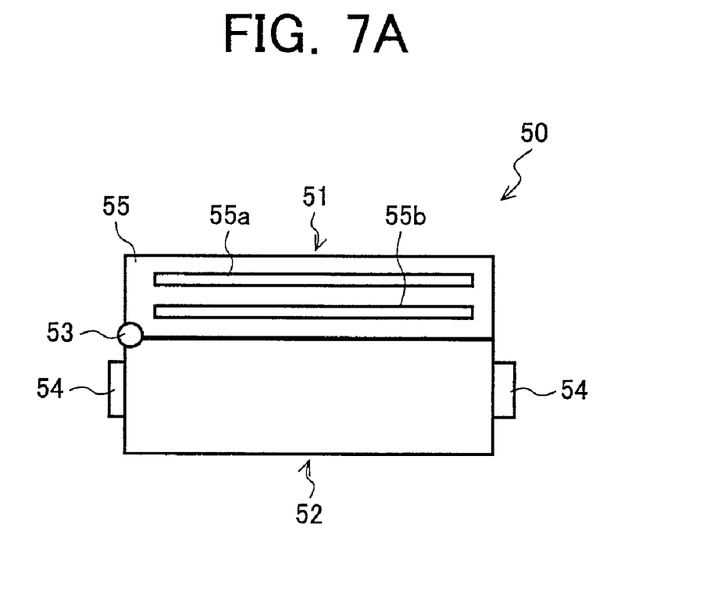
FIGS. 7A and 7B are diagrams showing an example of a scanner apparatus which is suitable for the information display system of the present invention.
Figure 7B:
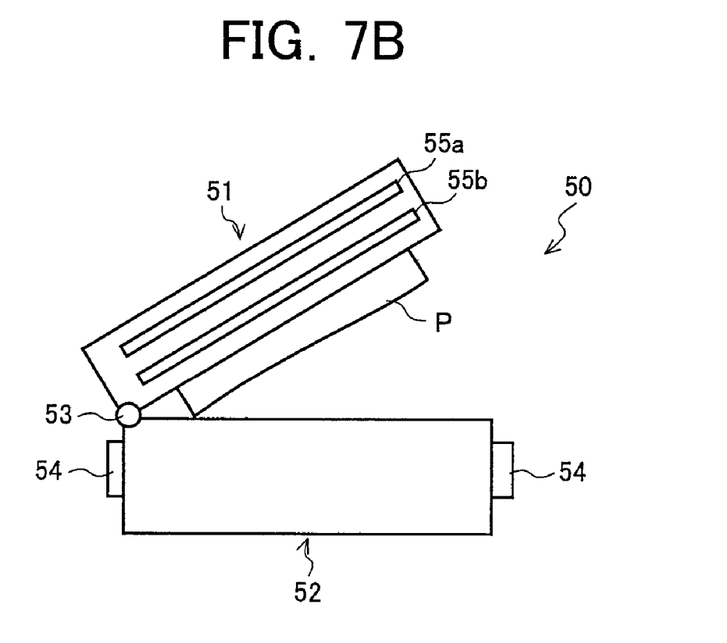

FIGS. 7A and 7B show an example of the scanner apparatus which is suitable for the above information display system. As shown in FIG. 7A, the scanner apparatus 50 is configured so that an upper unit 51 provided with an original insertion port 55a and an original discharge port 55b on the front face is rotatable on a rotary shaft 53, in which, for example, when a jam occurs, the scanner apparatus 50 which is stored in the storage space of the pedestal 20 is pulled out toward the near side in a state where the slide members 54 provided on the side parts of the main body are engaged with the rail portions 21a in the side of the pedestal 20, and the upper unit 51 incorporating an automatic document feeder is rotated as shown in FIG. 7B, followed by opening a part of a sheet feeding path to remove the jammed original.

According to the above scanner apparatus 50, in the case of an automatic document reading mode, the scanner apparatus can be used in the state of being stored in the storage space of the pedestal 20 after setting an original, and when a jam occurs, the scanner apparatus 50 is pulled out from the pedestal 20 so that a jammed original can be easily removed. Thus, it is possible to use the space in the front face of the display apparatus effectively.

Figure 3:
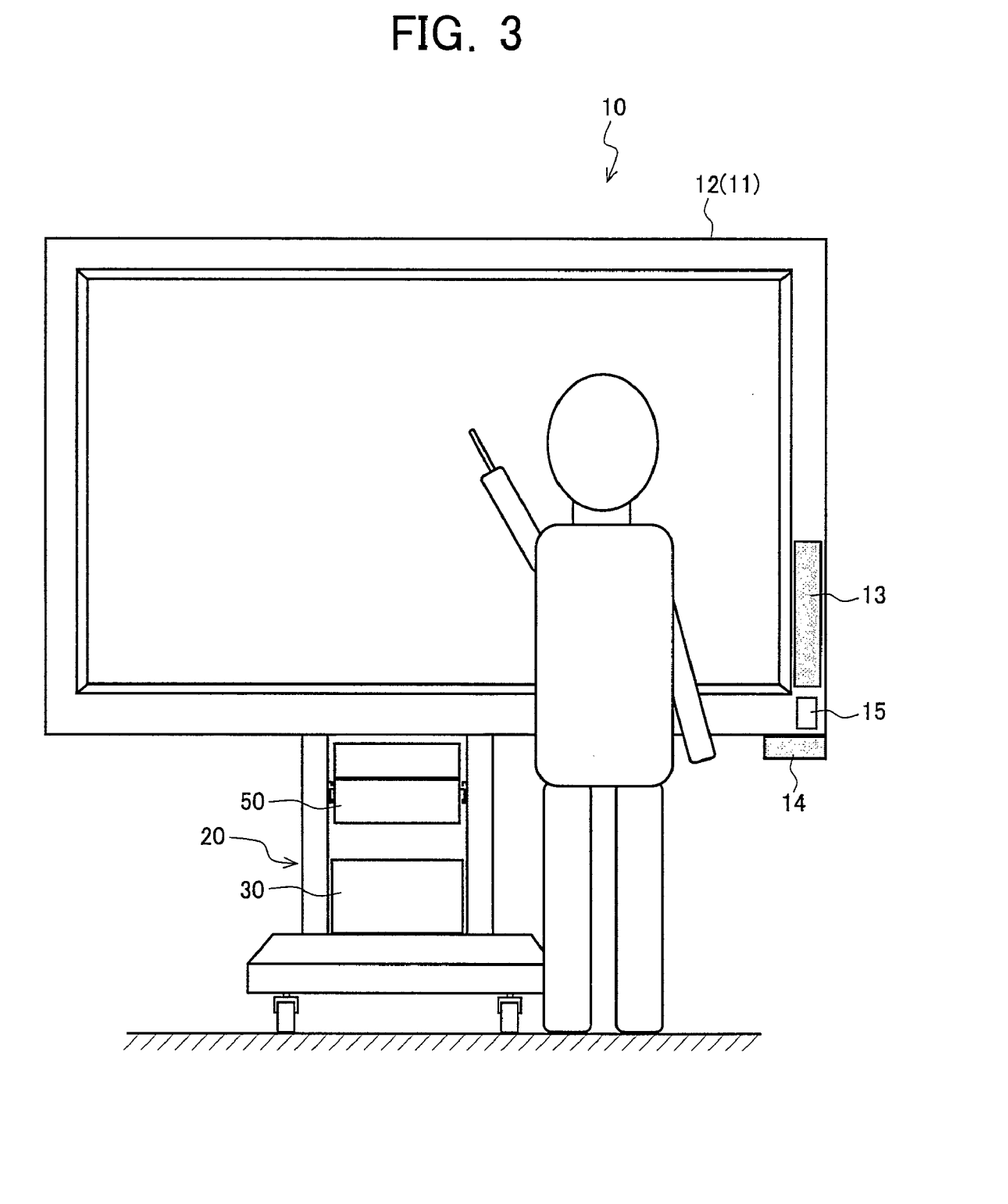
FIG. 3 is a diagram showing a scene using the information display system covered by the present invention.

When a side where the upper unit 51 is rotated to open the feeding path, which is a side where the operation input portion 13, the touch pen holder 14, and the power switch 15 are provided in the case of the large-sized display, is a side where a jammed sheet is easily removed by a user who is leading a conference, for example, the right side in the example shown in FIG. 3, the operability for the user is improved.

Figure 8:
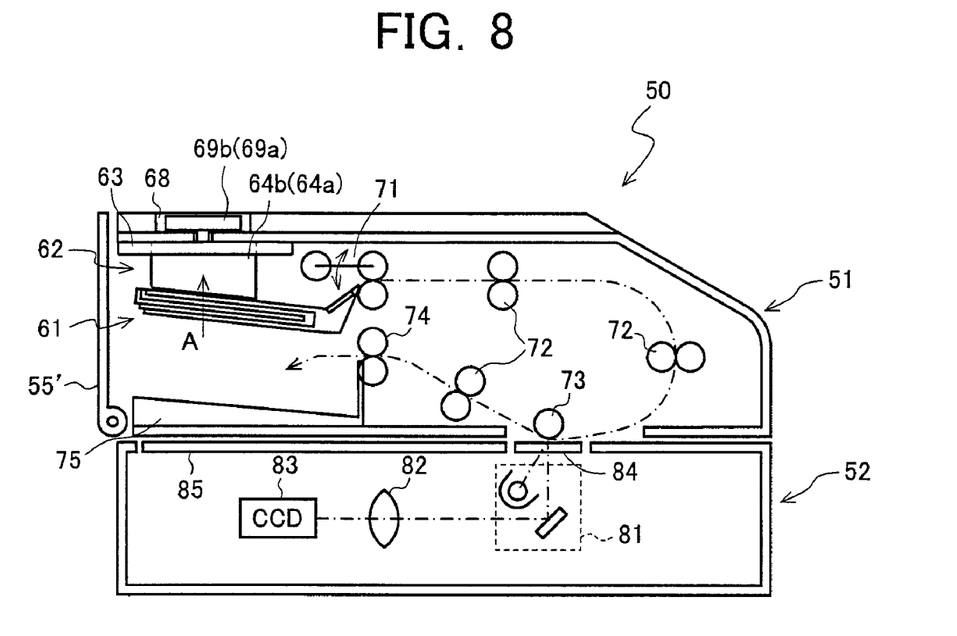
FIG. 8 is a diagram schematically showing the main structure in a housing of the scanner apparatus according to the embodiment of the present invention.

FIG. 8 is a diagram illustrating the scanner apparatus according to the embodiment of the present invention, which schematically shows the main structure in the housing of the scanner apparatus 50.

The scanner apparatus 50 is roughly divided into the upper unit 51 constituting an automatic document feeder and a lower unit 52 constituting an image reading device. The upper unit 51 includes a paper feed tray 61 on which an original bundle made of a plurality of originals is stacked, a width guide rack mechanism 62 having a function of detecting a size (width) of a sheet original, a paper feed roller 71 for taking out sheet originals set on the paper feed tray 61 sheet by sheet, a plurality of feed rolls 72 for feeding the taken sheet original, a press-contact roller 73 for putting a sheet original in press-contact with a first platen glass 84, a paper discharge roller 74 for discharging an original, the reading of which is finished, and a paper discharge tray 75.

The width guide rack mechanism 62 is provided above the paper feed tray 61 independently from the paper feed tray 61, and is able to have a compact structure separately from the paper feed tray and the width guide rack mechanism.

Figure 9:
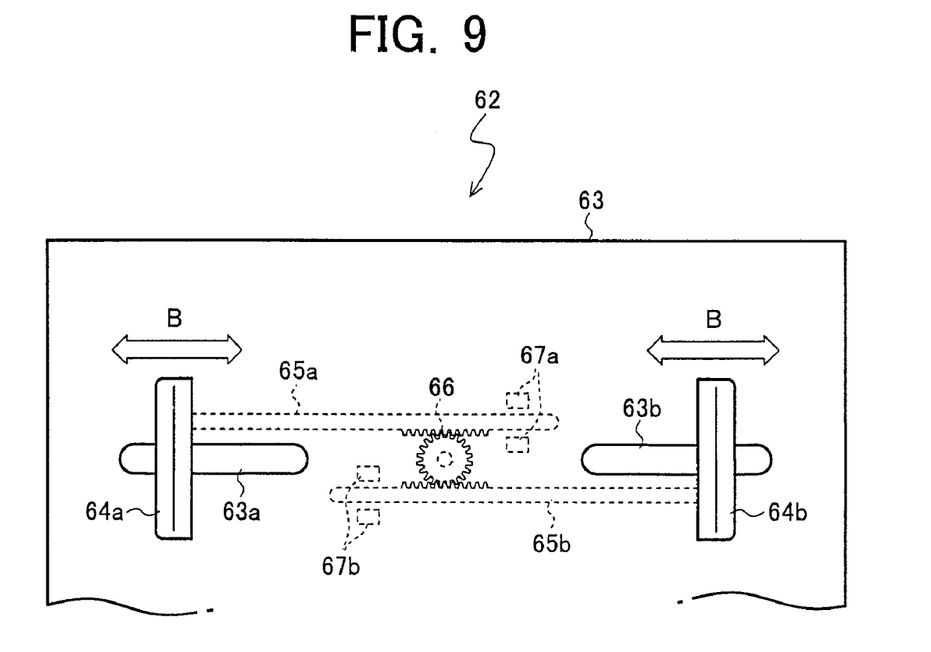
FIG. 9 is a diagram schematically showing a width guide rack mechanism in the scanner apparatus according to the embodiment of the present invention.

FIG. 9 shows the structure of the width guide rack mechanism for detecting a size of an original stacked on the paper feed tray 61. The width guide rack mechanism is formed on a board 63 above the paper feed tray 61, and the figure schematically shows the width guide rack mechanism 62 when viewed from a direction of the paper feed tray 61 (an arrow A of FIG. 8).

The board 63 is formed with guide slots 63*a* and 63*b* for moving width guide members 64*a* and 64*b* in a direction of an arrow B, and each of the width guide members 64*a* and 64*b* is slidingly movable.

Each of the width guide members 64*a* and 64*b* is attached with racks 65*a* and 65*b*,respectively, and each of the racks is engaged with a pinion 66 and moves in association with each other. Sensors 67*a* and 67*b* are disposed near tip parts of the racks 65*a* and 65*b*,and the size of the original is detected by sliding the width guide members 64*a* and 64*b* in the direction of the arrow B according to a size of an original to detect the positions (moving amount) of the racks 65*a* and 65*b*.

In the shown embodiment, a recessed part 68 is provided on the top face of the scanner apparatus 50, and operation members 69*a* and 69*b* for operating the width guide members 64*a* and 64*b* from an upper part of the scanner apparatus 50 are disposed thereon so as to penetrate the slot guides 63*a* and 63*b* formed on the board 63 to be connected to the width guide members 64*a* and 64*b* in the lower part. The operation members 69*a* and 69*b* enable to operate the width guide rack mechanism 62 from outside of the apparatus.

Note that, since it is possible to slidingly move the width guide members 64*a* and 64*b* directly from the front of the apparatus by opening a front door 55' in the operation of the width guide members 64*a* and 64*b*, the operation members 69*a* and 69*b* can be omitted, however, when this structure is included, the operation of the width guide members can be performed in a state where a paper feed tray on which an original is set is mounted in the apparatus and the front door is closed.

The lower unit 52 includes a scan unit 81 which has an exposure lamp for exposing an image surface of an original and a mirror for changing a reflected light image from the original toward a predetermined direction, an imaging lens 82 for optically reducing a light image obtained from the mirror of the scan unit 81, a CCD (Charge Coupled Device) image sensor 83 for sequentially applying photoelectric conversion to the light image imaged by the imaging lens 82 to output as electric signals, a first platen glass 84 for forming an aperture for the light to read an original fed by the document feeder in the upper unit 51, and a second platen glass 85 for reading an original, an image of which is to be read, in a stationary state. The image signal obtained by the CCD image sensor 83 is transmitted to a signal processing circuit (not shown).

Figure 10:
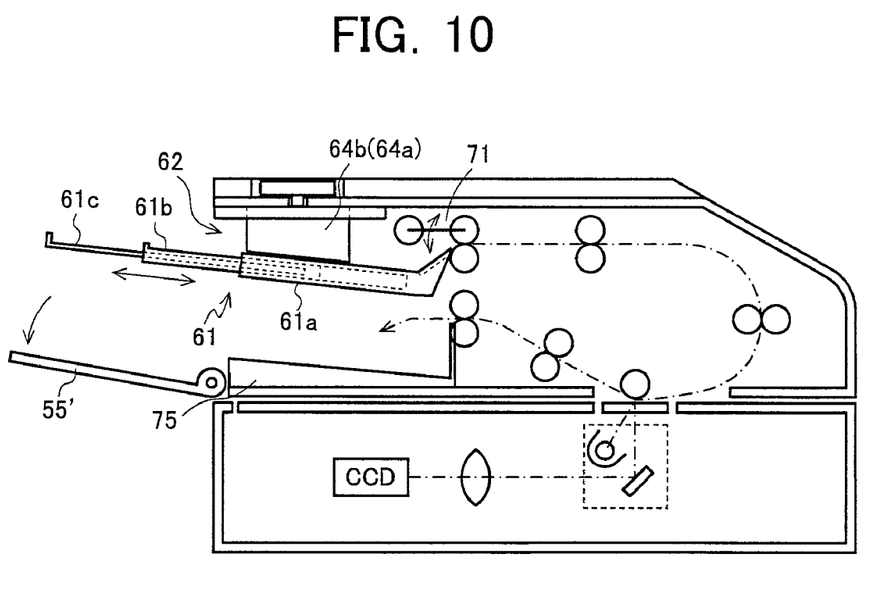
FIG. 10 is a detailed illustrative view of a paper feed tray in the scanner apparatus according to the embodiment of the present invention.

FIG. 10 is a diagram illustrating the paper feed tray 61 in detail, where the paper feed tray 61 includes a main tray 61*a*,an auxiliary tray 61*b* which is stored in the main tray 61*a* so as to be pulled out freely, and an auxiliary tray 61*c* which is stored in the auxiliary tray 61*b* so as to be drawn out freely, in which when an original has a size such that the original can not be stored in the apparatus, the front door 55' is opened and these auxiliary trays 61*b* and 61*c* are pulled out, so as to be applicable to a large-sized original. Note that, the front door 55' also serves as an auxiliary discharge tray when it is opened. Further, the front door 55' in the present embodiment may be also provided with an original insertion port and an original discharge port as the scanner apparatus shown in FIG. 7.

Figure 11:
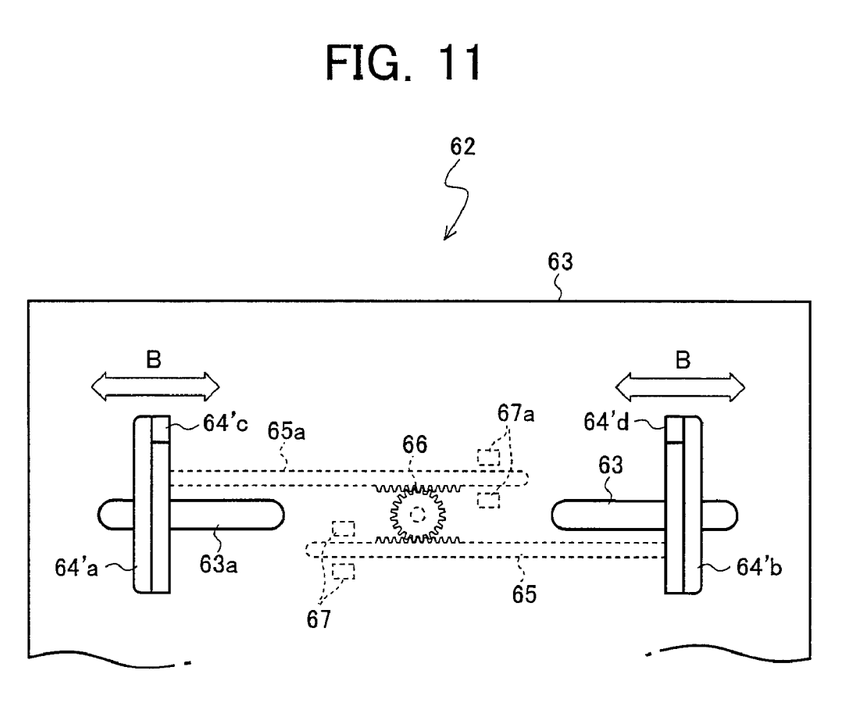
FIG. 11 is a diagram showing a width guide rack mechanism provided with width guide members having a different shape.
Figure 12:
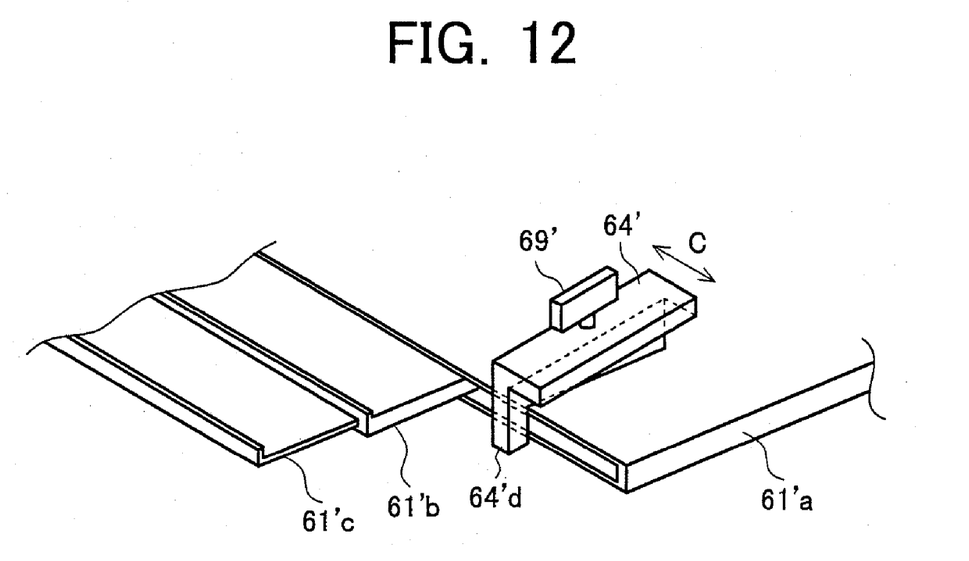
FIG. 12 is a perspective view showing the width guide members having the different shape and auxiliary trays.

FIGS. 11 and 12 are diagrams illustrating an embodiment for enabling, when originals are set, the reliable guide for up to the original in the lowermost layer.

FIG. 11 is a schematic view of the width guide rack mechanism provided with width guide members having a different shape for enabling the reliable guide for up to the original in the lowermost layer, and FIG. 12 is a perspective view showing the related structure of the different width guide members and the trays.

The different width guide members 64'*a* and 64'*b* in the present embodiment have extension portions 64'*c* and 64'*d* which extend to the lower side of the main tray 61*a* in order to enable the reliable guide for up to the original in the lowermost layer of originals stacked on the paper feed tray 61.

The auxiliary trays 61'*b* and 61'*c* which are drawn out freely are provided so as to have sizes which are gradually reduced than a width size of a minimum-sized original which can be detected by moving the width guide members 64'*a* and 64'*b* in a width direction (an arrow C of FIG. 12).

When the auxiliary tray has two stages like in the present embodiment, a width of the auxiliary tray 61'*b* in the second stage is made to be smaller than a width of a paper of a minimum readable size, the extension portions 64'*c* and 64'*d* are formed in edge parts of the width size guide members 64'*a* and 64'*b* as shown in FIG. 12, and the extension portions are protruded to the lower side of the main tray 61'*a*,thus making it possible to cause the width guide members to perform a reliable guide for up to the original in the lowermost layer.

Note that, in the embodiment illustrated in FIGS. 8 to 10 as well, by providing the recessed portion on the top face of the paper feed tray 61 (main tray 61*a*) corresponding to an area where the width guide members move, it is possible to cause the width guide members to perform a reliable guide for up to the original in the lowermost layer of the stacked originals.

According to the present invention, following effect can be obtained.

According to the present invention, a width guide rack mechanism provided with a paper feed tray and a function of detecting an original size can be configured separately and independently, and thereby it is possible to realize a compact scanner apparatus in which a whole of a paper feed portion of the scanner apparatus can be stored in the apparatus.

Further, according to the present invention, it is possible to realize an information display system which is convenient for a user who gives a presentation, etc., and has a compact structure that a scanner apparatus can be easily stored in the narrow storage space provided in a pedestal which supports a display apparatus in the information display system and a paper feed tray does not protrude to the front of the pedestal.

The invention claimed is:
1. A scanner apparatus comprising:
an upper unit provided with an automatic document feeder including a paper feed tray in which a sheet original is stored so as to be stackable and a width guide rack mechanism having an original size detection function of detecting a size of the sheet original stacked on the paper feed tray; and a lower unit provided with an image reading device for reading an image of the sheet original transported from the automatic document feeder, wherein the width guide rack mechanism is provided above the paper feed tray.

2. The scanner apparatus as defined in claim 1, wherein the width guide rack mechanism includes a width guide member, and the width guide member can be operated from outside of the apparatus.

3. The scanner apparatus as defined in claim 1, wherein the paper feed tray includes an auxiliary tray for supporting a part of the stacked original, and the auxiliary tray is stored in an inner part of the paper feed tray so as to be drawable.

4. The scanner apparatus as defined in claim 1, further comprising a rotatable front door in a position facing to the paper feed tray, wherein the front door functions as an auxiliary discharge tray in an opened state.

5. The scanner apparatus as defined in claim 1, further comprising slide members which are supported slidably on both outsides of a housing of the apparatus symmetrically.

6. An information display system, wherein the scanner apparatus with the slide members supported slidably as defined in claim 5 is stored between a pair of legs facing each other of a pedestal which supports a display apparatus on top of the legs and the scanner apparatus is connected to the display apparatus so that image information of the original read by the scanner apparatus can be displayed on a display portion of the display apparatus.

7. The information display system as defined in claim 6, wherein the display apparatus includes a touch panel on a front face of the display portion.

* * * * *